United States Patent Office 3,371,063
Patented Feb. 27, 1968

3,371,063
POLYVINYL HALIDE RESIN COMPOSITIONS
Theodore A. Girard, Wayne, N.J., assignor to Tenneco
Chemicals, Inc., a corporation of Delaware
No Drawing. Filed Oct. 20, 1965, Ser. No. 499,055
4 Claims. (Cl. 260—45.8)

ABSTRACT OF THE DISCLOSURE

Vinyl halide resin compositions that are resistant to attack by fungi and other microorganisms contain approximately 0.05% to 2% by weight of a compound having the structure

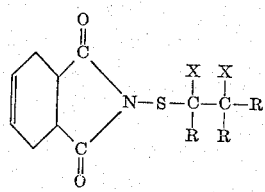

wherein each X represents a halogen atom and each R represents a hydrogen or halogen atom. Illustrative of these fungicidal compounds is N-(1,1,2,2-tetrachloroethylthio)-4-cyclohexene-1,2-dicarboximide.

---

This invention relates to novel polyvinyl halide compositions. More particularly it relates to polyvinyl halide compositions having improved resistance to deterioration resulting from attack by fungi and other microorganisms.

Polyvinyl halide compositions have found many useful applications because of their wide range of elastomeric and mechanical properties coupled with their good resistance to oxidation, to organic solvents, and to alkalies. These compositions are widely used as free or unsupported films or sheets, as extruded or molded products, as coatings for various textiles, and in other forms.

These polyvinyl halide compositions frequently contain as plasticizers or stabilizers materials that have their origin in animal or vegetable sources and which render the compositions susceptible to deteriorating attacks by fungi and other microorganisms. Such deterioration of the compositions seriously hinders their full scale utilization, particularly in those areas and in those applications that are conducive to such an attack. Various fungicidal compounds have been added to polyvinyl halide compositions to protect them from fungal attack, but none of these has heretofore proven satisfactory. Certain of the fungicides, for example, copper 8-quinolinolate, are exceedingly incompatible with polyvinyl halide compositions and when present even in very small amounts they crystallize or bloom on the surface of the composition thereby rendering it unfit for use. Other fungicides, such as quaternary ammonium naphthenates, are compatible with the resin and provide adequate protection against fungal attack, but they cannot withstand without darkening or otherwise deteriorating the heating to which they may be subjected during processing as well as subsequent heating of the finished product. While the deterioration that occurs during heating may not detract to any appreciable extent from the physical properties of the resins, the discoloration may seriously restrict their use in many applications.

This invention relates to a new class of fungicides for use in polyvinyl halide compositions. These compounds, which provide excellent resistance to deterioration resulting from attack by fungi and other microorganisms, are compatible with polyvinyl halide compositions, do not impart color to the compositions, and have excellent heat stability.

The fungicides that are used in the practice of this invention are N-(polyhaloethylthio)-4-cyclohexene-1,2-dicarboximides that have the structural formula

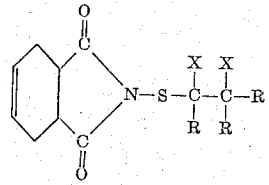

wherein each X represents a chlorine, bromine, or iodine atom and each R represents a hydrogen, chlorine, bromine, or iodine atom. Illustrative of these compounds are the following:

N-(1,2-dichloroethylthio)-4-cyclohexene-1,2-dicarboximide,
N-(1,2,2-tribromoethylthio)-4-cyclohexene-1,2-dicarboximide,
N-(1,2,2-trichloroethylthio)-4-cyclohexene-1,2-dicarboximide,
N-(1,2-diiodo-1,2-dichloroethylthio)-4-cyclohexene-1,2-dicarboximide,
N-(1,1,2,2-tetrachloroethylthio)-4-cyclohexene-1,2-dicarboximide,
N-(1,1,2,2,2-pentachloroethylthio)-4-cyclohexane-1,2-dicarboximide, and the like. A single N-(polyhaloethylthio)-4-cyclohexene-1,3-dicarboximide or a mixture of two or more of these compounds can be used in the compositions of this invention. For most applications, the preferred fungicide is N-(1,1,2,2-tetrachloorethylthio)-4-cyclohexene-1,2-dicarboximide.

The N-(polyhaloethylthio)-4-cyclohexene-1,2-dicarboximides may be prepared by any suitable and convenient procedure. For example, tetrahydrophthalimide and a 50% sodium hydroxide solution may be mixed with ice water until a clear solution is obtained and a solution of the appropriate polyhaloethylsulfenyl chloride added to the first solution while it is maintained at about 0° C. to form the N-(polyhaloethylthio)-4-cyclohexene-1,2-dicarboximide.

The fungicidal compounds of this invention may be added to the polyvinyl halide resin composition in any convenient way. For example, the fungicide may be added as such to the resin, or a solution of the fungicide in a suitable solvent, such as an alkanol, ether, or ketone, may be added to it. Alternatively, instead of being incorporated into the polyvinyl halide resin, the fungicidal compound in combination with a suitable solvent or carrier may be applied to the surface of the resin.

The novel polyvinyl halide compositions may be prepared by procedures that are obvious to those skilled in the art. For example, when the product is desired in film or sheet form, the polyvinyl halide resin, plasticizer, fungicide, and other ingredients if any may be mixed with or without the aid of a volatile solvent and milled at an elevated temperature until the composition is completely homogeneous. It may then be removed from the mill in the form of sheets or film of the desired thickness. When the polyvinyl halide composition is to be used as a plastisol, the ingredients may merely be mixed at approximately room temperature until a homogeneous composition is obtained which may then be formed or applied to a surface by such methods as knife-spreading, brushing, roller coating, dipping, molding, and the like.

To attain the desired degree of resistance to attack by fungi and other microorganisms, the polyvinyl halide composition should contain at least 0.05% and preferably 0.25% to 1.5% of the N-(polyhaloethylthio)-4-cyclohexene-1,2-dicarboximide based on the weight of the composition. Amounts of the fungicides larger than 2% may be used, but these larger amounts generally do not provide further improvement in the properties of the resinous compositions and for this reason are not ordinarily used. The amount of fungicide that will provide optimum protection for the resinous compositions depends upon such factors as the choice of fungicide, the choice of plasticizers and stabilizers and the amounts employed, and the application for which the composition is intended.

The vinyl halide polymers which may be employed in the composition of this invention are the resinous products obtained by the polymerization of a vinyl halide in the presence or absence of another polymerizable compound. The term "vinyl halide resin" includes vinyl halide homopolymers, such as polyvinyl chloride and polyvinyl bromide, as well as copolymers, such as those formed between a vinyl halide and at least one other polymerizable monoolefin, such as vinyl acetate, vinyl propionate, vinyl butyrate, vinylidene chloride, styrene, methyl methacrylate, dialkyl fumarate or maleate and the like. The vinyl halide used is ordinarily and preferably the chloride, although the bromide and fluoride may also be used. The copolymers useful in the practice of this invention are those prepared from at least 70% of vinyl halide and up to 30% of the other polymerizable mono-olefinic compound.

Any of the usual plasticizers for vinyl resins may be used in the compositions of the present invention. These include, for example, dioctyl phthalate, dibutyl sebacate, methyl acetyl ricinoleate, and the like. The plasticizer is generally present in the amount of about 5 to 100 parts per 100 parts of the resin. In addition other resin additives such as heat and light stabilizers, pigments, fillers, extenders, solvents, and the like, may be present in the amounts ordinarily employed for the purposes indicated.

The invention is further illustrated by the example that follows. In this example all percentages and parts are percentages by weight and parts by weight unless otherwise specified.

*Example*

A polyvinyl chloride composition, typical of the formulations into which the N-(polyhaloethylthio)-4-cyclohexene-1,2-dicarboximides can be incorporated, was prepared from the following ingredients:

| | Parts |
|---|---|
| Polyvinyl chloride (Geon 121) | 1000 |
| Dioctyl sebacate | 250 |
| Di-(2-ethylhexyl) phthalate | 300 |
| Epoxidized soy bean oil | 50 |
| Barium-cadmium-phosphite stabilizer | 20 |

To 81 parts of this plastisol formulation was added 0.3 part of cis-N - (1,1,2,2 - tetrachloroethylthio)-4-cyclohexene-1,2-dicarboximide. The mixture was stirred for 10 minutes, poured onto a glass plate, and drawn down into a film 20 mils thick. The film was fused for 10 minutes at 350° F. A sample of the film was leached for 24 hours in water at 80°–85° F. in accordance with Method 5831, CCC–T–191b.

From the leached and unleached vinyl films were cut two 1¼" diameter circles. These circles were placed on plates of agar which had previously been inoculated with a suspension of spores of *Aspergillus niger, Aspergillus flavus, Penicillium funiculosium,* and *Trichoderma* sp.

The plates, which were prepared in duplicate, were incubated at 28°–32° C. and observed at weekly intervals. The growth was estimated according to the following key, and the results of the duplicate plates were averaged:

0: No growth on the specimen
1–9: Increasing coverage and density of growth
10: Complete coverage of the specimen with growth The results of the tests are given in the table that follows:

| Fungicide | Cis-N-(1,1,2,2-tetrachloroethylthio)-4-cyclohexene-1,2-dicarboximide | None |
|---|---|---|
| Heat Stability | Excellent | Excellent |
| Fungus Growth After Incubation: | | |
| Unleached: | | |
| 1 Week | 0 | 3 |
| 2 Weeks | 0 | 6 |
| 3 Weeks | 0 | 8 |
| 4 Weeks | 0 | 8 |
| Leached: | | |
| 1 Week | 0 | 3 |
| 2 Weeks | 0 | 6 |
| 3 Weeks | 0 | 8 |
| 4 Weeks | 0 | 8 |

Each of the other N-(polyhaloethylthio)-4-cyclohexene-1,2-dicarboximides disclosed herein can be used in a similar manner to inhibit the growth of fungi and other microorganisms on vinyl halide resin compositions.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A composition resistant to attack by fungi and other microorganisms which comprises a polyvinyl halide resin selected from the group consisting of polyvinyl chloride, polyvinyl bromide, and copolymers containing at least 70% of vinyl halide units and up to 30% of units derived from vinyl acetate, vinyl propionate, vinyl butyrate, vinylidene chloride, styrene, methyl methacrylate, dialkyl fumarate, or dialkyl maleate and approximately 0.05% to 2%, based on the weight of the composition, of an N - (polyhaloethylthio)-4-cyclohexene-1,2-dicarboximide having the structure

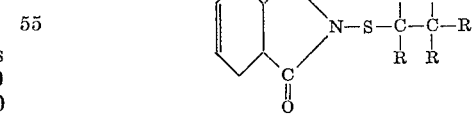

wherein each X represents a member selected from the group consisting of chlorine, bromine, and iodine and each R represents a member selected from the group consisting of hydrogen, chlorine, bromine, and iodine.

2. A composition as defined in claim 1 that contains 0.25% to 1.5%, based on the weight of the composition, of the N-(polychloroethylthio)-4-cyclohexene-1,2-dicarboximide.

3. A composition as defined in claim 2 wherein the fungicide is cis-N-(1,1,2,2-tetrachloroethylthio)-4-cyclohexene-1,2-dicarboximide.

4. A composition resistant to attack by fungi and other microorganisms which comprises polyvinyl chloride and 0.25% to 1.5%, based on the weight of the composition, of an N-(polyhaloethylthio)-4-cyclohexene-1,2-dicarboximide having the structure

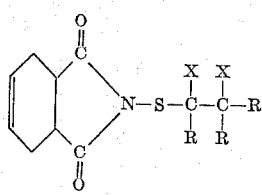

wherein each X represents a member selected from the group consisting of chlorine, bromine, and iodine and each R represents a member selected from the group consisting of hydrogen, chlorine, bromine, and iodine.

References Cited

UNITED STATES PATENTS

| | | | |
|---|---|---|---|
| 2,574,987 | 11/1951 | Shelley | 260—45.8 |
| 2,897,208 | 7/1959 | Phillips et al. | 260—45.8 X |
| 3,105,059 | 9/1963 | Van der Burg | 260—45.8 |
| 2,790,749 | 4/1957 | Van der Herk. | |

DONALD E. CZAJA, *Primary Examiner.*

M. J. WELSH, *Assistant Examiner.*